(12) United States Patent
Yilmaz et al.

(10) Patent No.: US 11,217,994 B2
(45) Date of Patent: Jan. 4, 2022

(54) POWER CONTROLLER FOR AIRCRAFT RECEPTACLES

(71) Applicant: digEcor I.P. and Assets PTY, LTD., West End (AU)

(72) Inventors: Arda Yilmaz, Brisbane (AU); Joshua Kelly, Brisbane (AU); Stuart Ketchion, Brisbane (AU)

(73) Assignee: Burrana IP and Assets, LLC, Springville, UT (US)

( * ) Notice: Subject to any disclaimer, the term of this patent is extended or adjusted under 35 U.S.C. 154(b) by 214 days.

(21) Appl. No.: 16/107,575

(22) Filed: Aug. 21, 2018

(65) Prior Publication Data
US 2020/0067307 A1 Feb. 27, 2020

(51) Int. Cl.
*B60L 1/00* (2006.01)
*B60L 3/00* (2019.01)
*H02J 1/14* (2006.01)
*G06F 1/26* (2006.01)
*B64D 11/06* (2006.01)
*H02M 1/08* (2006.01)

(52) U.S. Cl.
CPC ............ *H02J 1/14* (2013.01); *B64D 11/0624* (2014.12); *G06F 1/266* (2013.01); *H02M 1/08* (2013.01)

(58) Field of Classification Search
CPC ...... H02J 1/14; H02J 3/14; H02J 3/144; H02J 2310/44; H02J 2207/30; H02J 2310/60; H02J 2310/52; G06F 1/266; G06F 1/26; B64D 11/0624; B64D 2221/00; G01R 21/133; H02M 1/08
See application file for complete search history.

(56) References Cited

U.S. PATENT DOCUMENTS

| | | | |
|---|---|---|---|
| 8,661,268 B2 | 2/2014 | Brooks | |
| 9,577,432 B2 | 2/2017 | Li | |
| 9,727,109 B2 | 8/2017 | Hundal | |
| 9,766,674 B2 | 9/2017 | Dunstan | |
| 9,847,885 B2 | 12/2017 | Wendt | |
| 9,874,913 B2 | 1/2018 | Lester | |
| 9,874,930 B2 | 1/2018 | Vavilala | |
| 9,914,548 B1 * | 3/2018 | Vadillo | H02J 7/00036 |
| 2011/0001358 A1 | 1/2011 | Conroy | |

(Continued)

FOREIGN PATENT DOCUMENTS

| | | | |
|---|---|---|---|
| EP | 3131167 A1 | 2/2017 | |
| EP | 3493361 A1 * | 6/2019 | H02J 7/025 |
| JP | 2011520413 A | 7/2011 | |

*Primary Examiner* — Hal Kaplan
*Assistant Examiner* — Rasem Mourad
(74) *Attorney, Agent, or Firm* — Fabian VanCott; Steven L Nichols

(57) ABSTRACT

A system for allocating power includes a plurality of receptacles and a power delivery controller communicatively coupled to the plurality of receptacles. The power delivery controller is to: detect a new connection to a first receptacle of the plurality of receptacles; receive a request from the first receptacle which would exceed an amount of uncommitted available power; request a device attached to a second receptacle of the plurality of receptacles reduce an amount of power being received from the second receptacle; and in response to detecting a reduction of power to the second receptacle, provide power to the first receptacle as indicated in the request.

18 Claims, 4 Drawing Sheets

(56) References Cited

U.S. PATENT DOCUMENTS

| | | | |
|---|---|---|---|
| 2012/0072749 A1* | 3/2012 | Conroy | G06F 1/324 |
| | | | 713/322 |
| 2014/0091752 A1 | 4/2014 | Serrano | |
| 2014/0117753 A1 | 5/2014 | Ece | |
| 2014/0292070 A1* | 10/2014 | Poh | H04L 12/40182 |
| | | | 307/4 |
| 2014/0325245 A1 | 10/2014 | Santini | |
| 2016/0306417 A1* | 10/2016 | Greig | B64D 11/06 |
| 2016/0370835 A1 | 12/2016 | Erickson | |
| 2017/0046289 A1 | 2/2017 | Hundal | |
| 2017/0147052 A1 | 5/2017 | Waters | |
| 2017/0185126 A1 | 6/2017 | Trethewey | |
| 2017/0237266 A1 | 8/2017 | Hatakeyama | |
| 2017/0279270 A1 | 9/2017 | Motoki | |
| 2017/0293335 A1 | 10/2017 | Dunstan | |
| 2017/0311417 A1 | 10/2017 | Wendt | |
| 2017/0311419 A1 | 10/2017 | Wendt | |
| 2017/0338673 A1 | 11/2017 | Inha | |
| 2017/0358947 A1 | 12/2017 | Waters | |
| 2018/0120910 A1* | 5/2018 | Farkas | G06F 1/189 |
| 2018/0287491 A1* | 10/2018 | Muto | G06F 1/266 |
| 2018/0323626 A1* | 11/2018 | Suen | H02J 7/0044 |

* cited by examiner

POWER CONTROLLER FOR AIRCRAFT RECEPTACLES

BACKGROUND

Airplanes are an unusual design environment. The plane, when in flight, provides its own power to support operations, which is provided by generators. Customers on airline flights are supplied with magazines and in-flight movies to provide entertainment and diversion. However, the development of portable electronic devices such as laptops, tablets, and phones has allowed for the use of these devices on flights. Portable electronic devices have limited power storage and airlines have seen increasing demand for outlets and power to charge and/or power devices in flight.

BRIEF DESCRIPTION OF THE DRAWINGS

The accompanying drawings illustrate various examples of the principles described herein and are a part of the specification. The illustrated examples do not limit the scope of the claims.

Figure 1:
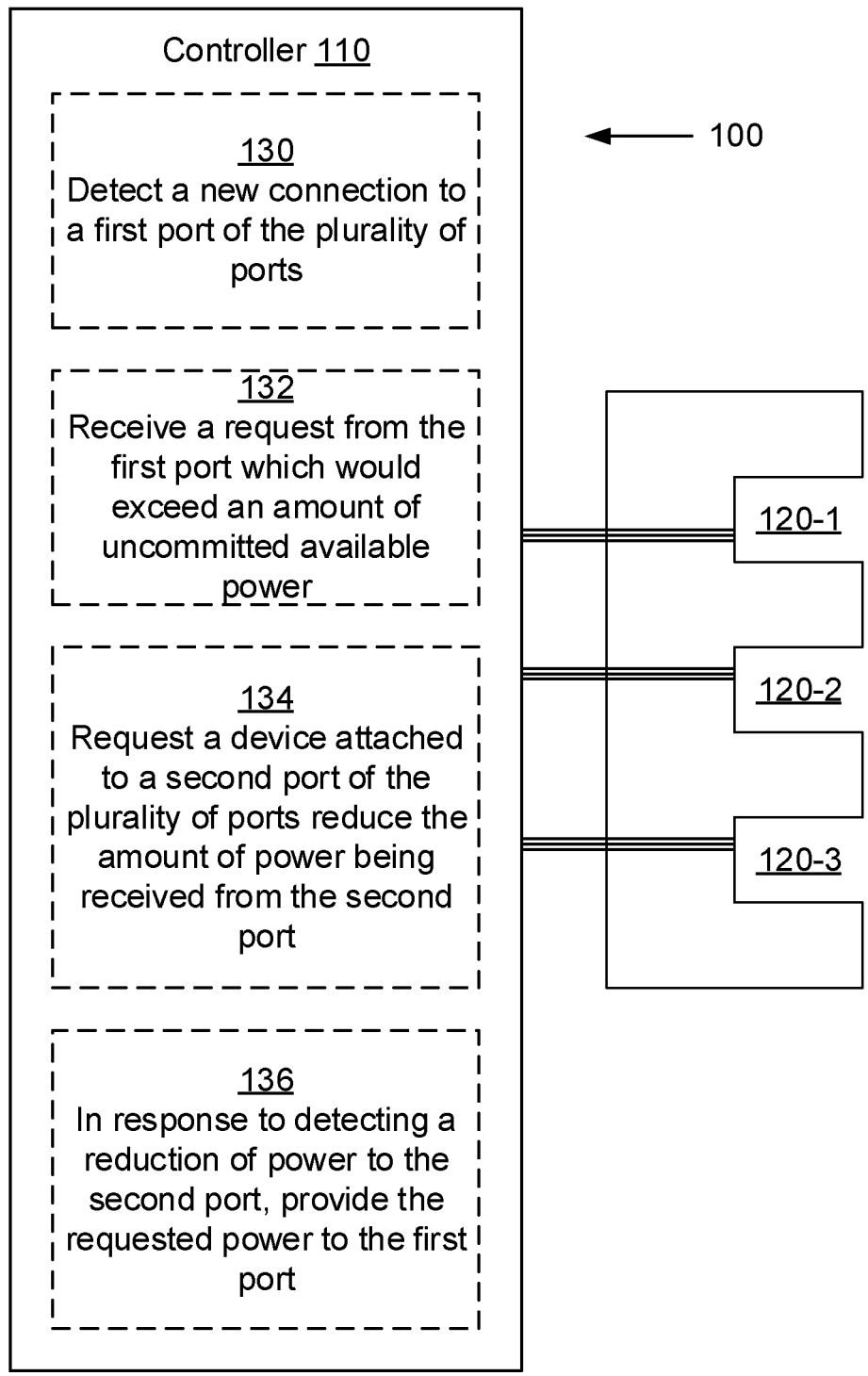
FIG. 1 shows a system for allocating power according to an example consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Increasing use of consumer electronic devices such as laptops, tablets, and phones has led to a demand for outlets to recharge devices in flight. Some seats on some airplanes have been provided with traditional power outlets. However, for a variety of reasons, many planes have been outfitted with Universal Serial Bus (USB) receptacles instead. USB receptacles are a combination power and data receptacle. However, much of the use of USB receptacles on planes is to provide power without data transfer.

As used in this specification and the associated claims, the female end of a USB connection is alternately known as a receptacle and the male end of a USB connection is alternately known as a plug.

Among other examples, this specification describes a system for allocating power. The system includes a plurality of receptacles and a power delivery controller communicatively coupled to the plurality of receptacles. The power delivery controller is to: detect a new connection to a first receptacle of the plurality of receptacles; receive a request from the first receptacle which would exceed an amount of uncommitted available power; request a device attached to a second receptacle of the plurality of receptacles reduce an amount of power being received from the second receptacle; and in response to detecting a reduction of power to the second receptacle, provide power to the first receptacle as indicated in the request.

Among other examples, this specification describes a system for allocating power in a control zone on an airplane. The system includes a power delivery controller. The power delivery controller: receives a signal from a first receptacle indicating a connection has been made to the first receptacle; provides a list of available power profiles to the connection; determines an available power to the control zone, wherein the control zone includes a plurality of receptacles including the first receptacle; receives an election of a power profile from the first receptacle, wherein an elected power profile exceeds an uncommitted available power; provides the elected power profile to the first receptacle; provides a load shed request to a second receptacle of the plurality of receptacles; reduces a power profile provided to the second receptacle and commences a timer; and upon expiration of the timer, connects the second receptacle at its previous, higher power profile.

The system may further reduce the second receptacle to a lower power profile. The system may maintain the power allocation below a total zone max load.

Among other examples, this specification also describes a system for allocating power. The system includes a plurality of receptacles in a power control zone and a controller in communication with each of the plurality of receptacles. The controller, in response to detecting a new connection to a first receptacle in the plurality of receptacles: determines which power profiles may be provided to the first receptacle without exceeding an unallocated power available in the power control zone; provides to the first receptacle, power profiles which will not exceed the unallocated power available while not providing to the first receptacle, the power profiles which will exceed the unallocated available power; receives an election of a power profile from the first receptacle; and provides power to the first receptacle according to the elected power profile.

Turning now to the figures, FIG. 1 shows a system (100) for allocating power according to an example consistent with this specification. The system (100) includes a plurality of receptacles (120) and a power delivery controller (110) communicatively coupled to the plurality of receptacles (120). The power delivery controller (110) is to: detect (130) a new connection to a first receptacle (120-1) of the plurality of receptacles (120); receive (132) a request from the first receptacle (120-1) which would exceed an amount of uncommitted available power; request (134) a device attached to a second receptacle (120-2) of the plurality of receptacles (120) to reduce the amount of power being received from the second receptacle (120-2); and in response to detecting a reduction of power to the second receptacle (120-2), provide the requested power to the first receptacle (120-1). Also shown is a third receptacle (120-3).

The system (100) allocates power to a plurality of receptacles (120) in a control zone. The control zone may have a fixed amount of available power. A control zone is a group of receptacles (120) allocated a shared allotment of power controlled by the controller (110). In some examples, the controller (110) may be able to negotiate a higher amount of available power depending on demands within the control zone. The controller (110) may negotiate with a power supply. The controller (110) may negotiate with controllers in adjacent control zones. The controller (110) may negotiate with a system level controller.

The use of control zones is useful in planes and other closed systems. When there is no grid from which to draw additional power, excessive draws can produce problems. The power is zone limited by the head end power unit. Control zones allow local allocation of power while preventing unexpected and/or uncontrolled current sinks/loads/draws from propagating through a system and potentially impacting other zones or systems. Instead, the control zones contain and limit the current draw to the allocated amount, while sharing what is available.

The controller (110) allocates power to the associate receptacles (120) based on elected power profiles made by devices attached to the receptacles (120).

The receptacles (120) may be universal serial bus receptacles. Specifically, at least the first receptacle (120-1) may be a Universal Serial Bus-Type C (USB-C) receptacle. In other examples, the first receptacle (120-1) may be another type of USB receptacle. In even further examples, the first receptacle (120-1) may be a non-USB receptacle. The first receptacle (120) may be a charging receptacle. Each receptacle (120) may be connected to a device. A receptacle (120) may support multiple devices.

The controller (110) detects (130) a new connection to a first receptacle (120-1) of the plurality of receptacles (120). For example, the controller (110) may receive a signal from the first receptacle (120-1). The controller (110) may receive a communication line being pulled up by the newly attached load.

The controller (110) receives (132) a request from the first receptacle (120) which would exceed an amount of uncommitted available power. The request may be an election of a set of power profiles offered by the controller (110). A power profile is a defined voltage and available amount of current/power that may be provided by the receptacle. Power profiles are available with may receptacle (120) standards, including USB standards. The request may be for a draw that is greater than or equal to the uncommitted available power.

The uncommitted available power may be determined by taking the power allocation for the zone and subtracting the maximum amount of power associated with the power profile of each device attached to a receptacle (120) in the zone. For example, if the zone has a power allocation of 120 watts and there are two high power USB-3 devices with power profiles of 4.5 watts each and a USB-C device with a power delivery (2.0) profile of 100 watts, the uncommitted available power would be 120−2*4.5−100=11 watts. Accordingly, if another USB-C connection was made with a profile request of 15 watts then the system (100) would engage in its load shedding routine to enable the new connection.

The controller (110) requests (134) a device attached to a second receptacle (120) of the plurality of receptacles (120) reduce an amount of power being received from the second receptacle (120-2). A request to reduce the amount of power being drawn by a device on a receptacle (120) is known as load shed or load shed request. Reducing the amount of power being received may include ceasing to draw power from the second receptacle (120-2). Reducing the amount of power being received may include selecting a lower power profile from a set of power profiles, which lower power profile draws less power. A load shed operation reduces the demand for power from the loads on the system.

The system (100) may flag the second receptacle (120-2) to indicate that the associated device could use additional power. Such flags may be useful for implementing rotating and/or sharing of reduced power levels from the associated receptacles and devices.

Selecting the second receptacle (120-2) which is to receive a load shed request from the plurality of receptacles (120) may be based on a variety of factors. In an example, the receptacle (120) with the longest session time is selected as the second receptacle (120). A receptacle (120) with a longest session time is the receptacle in the control zone that has been providing power for the longest continuous period. The receptacle (120) with the longest session time and a draw above a threshold may be selected as the second receptacle (120-2). The receptacle (120) with the greatest power draw may be selected as the second receptacle (120-2). The receptacle (120) with the greatest power draw having a session length above a threshold time may be selected as the second receptacle (120-2). The method of selecting the second receptacle (120-2) may incorporate more complex balancing between length of session and usage. This balancing may be dynamically performed when a load is added to and/or removed from the system (100) at one of the receptacles (120).

As discussed further below, the receptacle (120) receiving a load shed request, (a request to decrease the amount of power consumed at the receptacle (120)), may be rotated through the active receptacles (120) or a subset of the active receptacles (120). In this example, the subset of active receptacles is determined based on a threshold power use such that lower power receptacles are excluded from this timesharing arrangement. The load shed request may reduce a power profile on the second receptacle (120-2) to a lower, non-zero profile. This may allow the load shed, that is, the reduction of power, to not impact the passenger using the device on the second receptacle (120-2). For example by reducing the load to an operating power profile rather than the charging power profile the device will continue to operate but the charging of the device will stop and/or slow. In some versions, the system (100) seeks to provide each receptacle (120) with operating power before providing recharging power to any receptacle (120).

As an example, consider three receptacles (120) A, B, and C each with a demand of 60 watts in a zone with 120 watts. In this example, the system (100) provides receptacle A with 60 watts when its load attaches, the system (100) also provides receptacle B 60 with watts when its load attaches. A load is then attached to receptacle C, which load requests 60 watts, which is greater than the uncommitted available power. The system (100) identifies receptacle A as having the longest session and sends a load shed request to receptacle A. Responsive to the request, receptacle A is reduced to 10 watts. The system (100) then recognizes that this is still not enough to provide the requested power to Receptacle C and sends a load shed request to receptacle B, thus reducing its load to 50 watts. Receptacle C is then powered at 60 watts. A timer is activated and when the timer expires, a load shed request to Receptacle B reduces its power to 10 watts, a load shed request to receptacle C reduces its power to 50 watts, and Receptacle A is restored to 60 watts. The timer is reset and when the timer expires again, the power provision is shifted again to provide 50, 60, and 10 watts to receptacles A, B, and C respectively. This can then continue to cycle the charging voltage through the active receptacles which have requested additional power.

In a similar example, instead of allocating the minimum to one receptacle (120) and the remainder to a second receptacle (120), the system divides the available power between the receptacles with the longest sessions. For example, using the 120 watt zone above with three 60 watt requests, the power is allocated 60 watts to the most recent request with the remainder divided between the remaining receptacles, i.e. 30 watts each.

In an example, the system (100) powers all use requests prior to filling charging requests. The remaining power may be rotated through the charging devices and/or may be split between the charging devices. This may minimize the number of passengers having a non-operative device.

The controller (110), in response to detecting a reduction of power to the second receptacle (120-2), provides (136) the requested power to the first receptacle (120-1). As discussed above, this may include starting a timer which, when it expires rotates the power allocations between the receptacles (120).

In an example, when the controller (110) receives a request from a third receptacle of the plurality of receptacles which request does not exceed the uncommitted available power, the controller provides the requested amount of power to the third receptacle without modifying the power provided to any other receptacle of the plurality of the receptacles.

Figure 2:
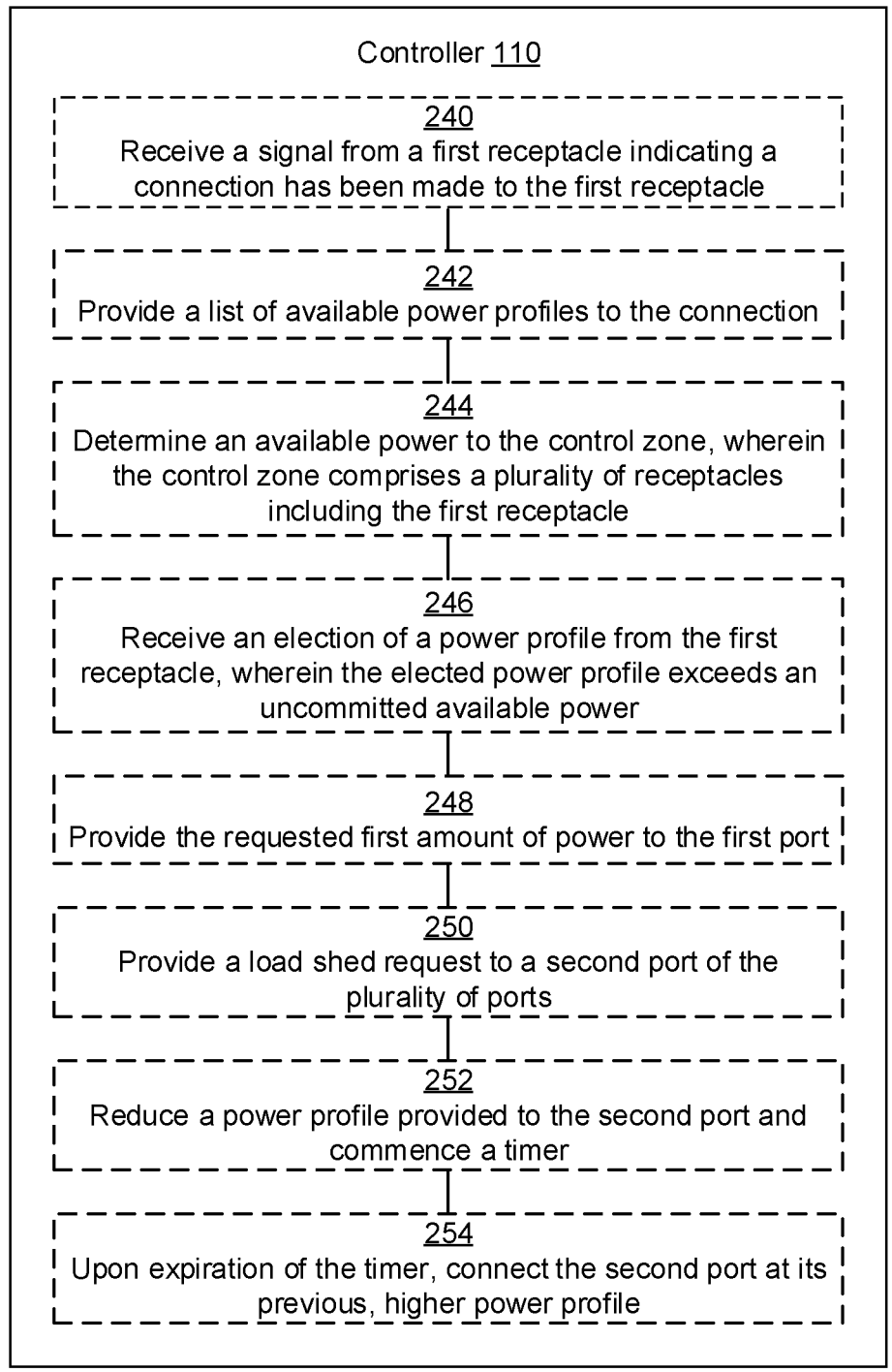
FIG. 2 shows a system for allocating power in a control zone on an airplane consistent with this specification.

FIG. 2 shows a system (100) for allocating power in a control zone on an airplane. The system (100) includes a power delivery controller (110). The power delivery controller receives (240) a signal from a first receptacle indicating a connection has been made to the first receptacle; provides (242) a list of available power profiles to the connection; determines (244) an available power to the control zone, wherein the control zone includes a plurality of receptacles including the first receptacle; receives (246) an election of a power profile from the first receptacle, wherein the elected power profile exceeds an uncommitted available power; provides (248) the requested power profile to the first receptacle; provides (250) a load shed request to a second receptacle of the plurality of receptacles; reduces (252) a power profile provided to the second receptacle and commences a timer; and upon expiration of the timer, connect (254) the second receptacle at its previous, higher power profile and reset the session length for the second receptacle.

The system (100) allocates power in a control zone in on an airplane. Specifically, the system (100) allocates power to different receptacles (FIG. 1, 120) and the devices attached to those receptacles. The system (100) operates with a power budget, which in some examples, is fixed. In other examples, the system (100) may be able to negotiate modifications to the power budget with a system level controller or peer controllers based on local demands.

The controller (110) provides the described functionality shown in the dashed boxes inside the controller (110) in FIG. 2. The controller (110) includes a processor and an associated memory. The controller (110) may include multiple processors, multiple memories, sensors, a display, etc. The controller may be located locally to the receptacles, for example, the controller (110) may be integrated into one of the bodies forming the receptacles. The controller (110) may be located under and/or within a seat in a row of seats forming a control zone.

The controller (110) receives (240) a signal from a first receptacle indicating a connection has been made to the first receptacle. The signal may be made by passing a voltage on a communication line. The signal may be a current draw or load on the power line. The signal may provide configuration data about the device attached to the receptacle. The signal may be followed by an exchange of configuration data.

The controller (110) provides (242) a list of available power profiles to the connection and determine (244) an available power to the control zone. The controller (110) may limit the available power profiles based on the control zone. For example, the controller (110) may be configured not to support charging in some or all control zones of aircraft. The controller (110) may provide both power and data connections. The controller may provide power but require a payment for use of a data and/or power connection.

The controller (110) receives (246) an election of a power profile from the first receptacle, wherein the elected power profile exceeds an uncommitted available power. If the election does not exceed the uncommitted available power, the controller provides the elected power profile but does not perform the load shed routines described below. This is because there is adequate power for all users to receive their preferred power profiles. Accordingly, all users are supplied with their preferred power profiles and the system waits for another connection and/or disconnection before assessing whether to adjust power profiles for any user.

The controller (110) provides (248) the elected power profile to the first receptacle. As noted above, this occurs regardless of whether the requested power profile will exceed the available unallocated power in the control zone. If the new power profile does not exceed the unallocated power, then no additional steps are taken until a connection is changed, added, and/or removed. When the elected power profile exceeds the available unallocated power, then the subsequent load shedding activities are performed.

Specifically, the controller (110) provides (250) a load shed request to a second receptacle (FIG. 1, 120-2) of the plurality of receptacles (FIG. 1, 120). A variety of factors may be used to determine the second receptacle (FIG. 1, 120-2) that is to have its power reduced. For example, the second receptacle (FIG. 1, 120-2) may be selected based on session length, power profile, and/or a combination of these two factors. Selection of the second receptacle (FIG. 1, 120-2) may exclude sessions using non-charging power profiles. Selection of the second receptacle (FIG. 1, 120-2) may exclude sessions using low-power device power profiles. Selection of the second receptacle (FIG. 1, 120-2) may prioritize based on these factors rather than excluding based on them. Selection of the second receptacle (FIG. 1, 120-2) may depend on services purchased by a passenger. For example, a passenger who purchased internet access may be prioritized over a passenger who did not purchase internet access. Generally speaking, selecting the second receptacle (FIG. 1, 120-2) based on the power profile so as to identify high power users minimizes the number of passengers impacted and reduces the number of communications required to provide services to the control zone. For example, reducing the power consumption of one recharging device on one receptacle (FIG. 1, 120) may be more effective at freeing up power than reducing the power consumption of multiple non-recharging devices on multiple receptacles.

In an example, the second receptacle (FIG. 1, 120-2) is a receptacle with a greatest load among the plurality of receptacles (FIG. 1, 120). In another example, the second receptacle (FIG. 1, 120-2) is a receptacle (FIG. 1, 120) with a longest session time among the plurality of receptacles (FIG. 1, 120).

The controller (110) reduces (252) a power profile provided to the second receptacle (FIG. 1, 120-2) and commences a timer. In some examples, the power profile may be reduced to zero. In other examples, the power profile may be reduced to a lower consumption power profile. For example, a device may be moved from a recharging profile to a profile that supports just active power consumption. Reducing to a lower, but non-zero power profile allows the impacted user to continue to use their device. In some cases, the device may start to draw battery power. In other cases, the device operations will be supported but charging operations will stop.

The controller (110), upon expiration of the timer, connects (252) the second receptacle at its previous, higher power profile. The controller (110) may treat this connection as a new session. That is, the controller (110) may send a request to another receptacle in the system to decrease its power profile. This process may be continued with the device not getting its preferred power allocation rotating through a set of receptacles. In some examples, the set of receptacles (FIG. 1, 120) is all active receptacles (FIG. 1, 120), i.e., receptacles (FIG. 1, 120) with a load attached to them. In other examples, the set of receptacles (FIG. 1, 120) is a subset of active receptacles (FIG. 1, 120). Effectively, the charging operations are timeshared among some or all of the receptacles (FIG. 1, 120) in the control zone. In some examples, only charging devices participate in this sharing while those using lower consumption power profiles are powered at a constant level. This minimizes the number of changes performed by the controller (110) and minimizes the impact on a larger number of passengers.

The power delivery controller (110) may rotate which receptacle (FIG. 1, 120) among the plurality of receptacles (FIG. 1, 120) is provided with less than an originally requested amount of power at regular intervals.

In an example, the first receptacle (FIG. 1, 120-1) has connections that include a power supply line, a ground line, and two communication lines. The first receptacle (FIG. 1, 120-1) may accept a Universal Serial Bus Type-C (USB-C) plug. The first receptacle (FIG. 1, 120-1) may accept a Universal Serial Bus Type-C (USB-C) plug and have only the following electrical connections: a power supply line, a ground line, and two communication lines.

Figure 3:
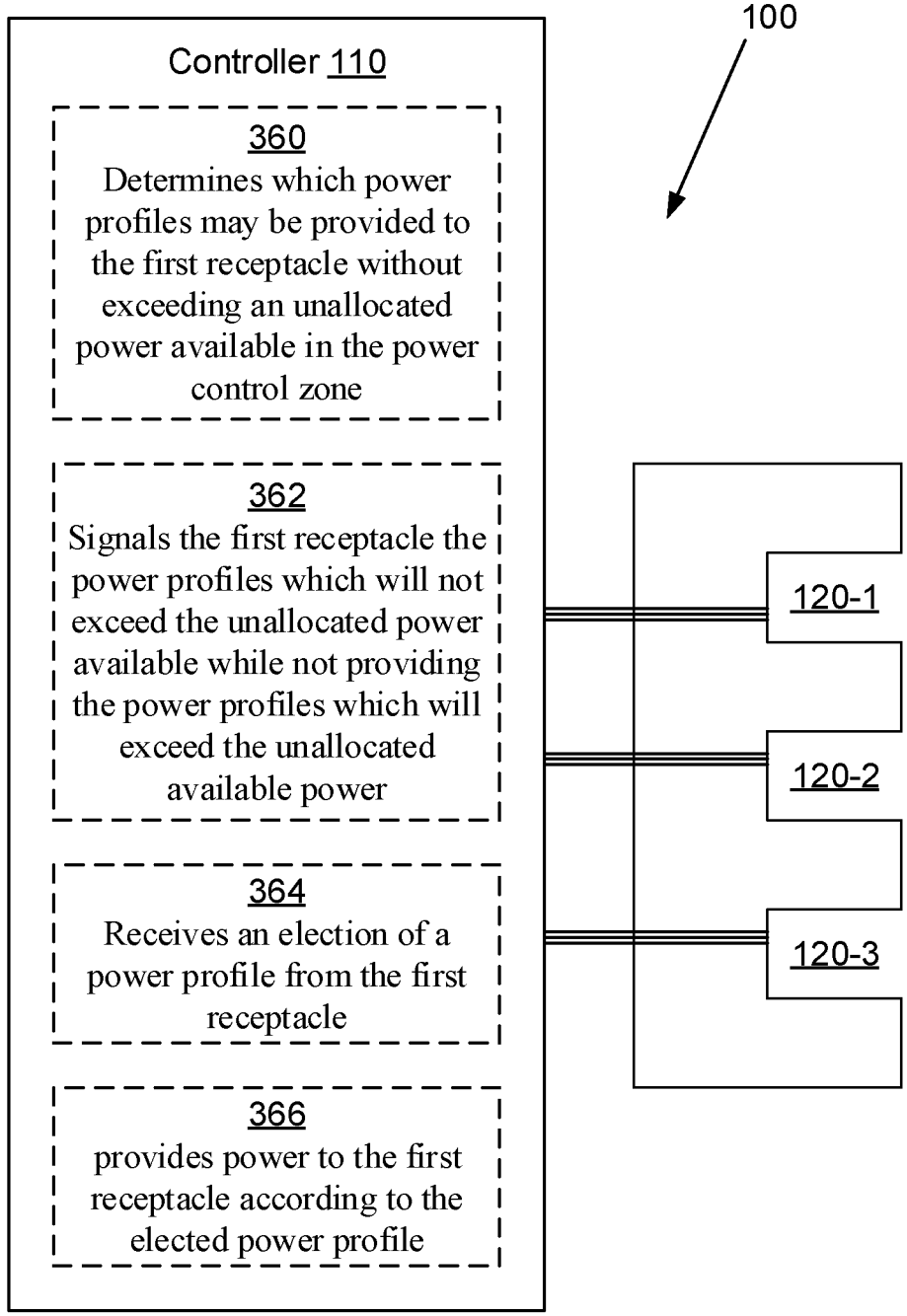
FIG. 3 shows a system for allocating power according to an example consistent with this specification.

FIG. 3 shows a system (100) for allocating power according to an example consistent with this specification. The system (100) includes a plurality of receptacles (120) in a power control zone and a controller (110) in communication with each of the plurality of receptacles (120). The controller (110), in response to detecting a new connection to a first receptacle (120-1) in the plurality of receptacles (120), determines which power profiles may be provided to the first receptacle (120-1) without exceeding an unallocated power available in the power control zone (360); provides to the first receptacle (120-1) those power profiles which will not exceed the unallocated power available while not providing those power profiles which will exceed the unallocated available power (362); receives an election of a power profile from the first receptacle (120-1) (364); and provides power to the first receptacle (120-1) according to the elected power profile (366). Also shown are a second receptacle (120-2) and a third receptacle (120-3).

The system (100) provides power to the plurality of receptacles (120) in a power control zone. The power control zone may include a row of seats on an airplane. The power control zone may cover portions of multiple rows of seats on an airplane. The power control zone may cover a portion of a single row of seats on an airplane, for example, all the adjacent seats between two aisles or between an aisle and a window.

The control (110) includes a processor and an associated memory. The controller (110) may include other components such as controls, switches, memories, processors, etc.

The receptacles (120) are ports which allow connections to portable electronic devices. The receptacles (120) may be Universal Serial Bus (USB) receptacles (120). The receptacles (120) may include USB-C receptacles (120). The receptacles (120) may include receptacles (120) which accommodate USB-C plugs but contain only four electrical connections: power, ground, and two communications lines.

The controller (110) performs a set of activities in response to detecting a new connection to a first receptacle (120) in the plurality of receptacles (120). The controller (110) may perform the set of activities under other conditions as well. For example, the controller (110) may provide a new set of profiles to one or more receptacles (120) after a load is removed from a receptacle (120) and sufficient unallocated power becomes available in the system to charge a device attached to one of the receptacles (120).

The controller (110) determines which power profiles may be provided to the first receptacle (120) without exceeding an unallocated power available in the power control zone (360). For example, the controller (110) maintains a value corresponding to the unallocated power in the power control zone. The controller (110) may calculate the value of unallocated power in the power control zone in response to detecting the connection at the receptacle (120). The controller (110) may then parse a list of power profiles based on the maximum amount of power which is provided under the respective power profile. This power profiles may be listed by increasing or decreasing maximum power such that once the parsing controller (110) reaches a first qualifying or non-qualifying profile, the controller (110) may cease parsing and apply the same determination to the subsequent profiles in the list.

The controller (110) may remove some of the power profiles from the list for other reasons. For example, the controller may recognize some of the power profiles as inapplicable to a type of device attached to the first receptacle (120-1). In this example, the power profiles may be further limited by a device connected to the first receptacle (120-1). The controller (110) may identify a start of flight condition and limit recharging during an initial period, e.g., 30 minutes to limit having to down regulate power to receptacles (120) as more devices are added to receptacles (120) in the power control zone.

The controller (110) provides the first receptacle (120-1) with the power profiles which will not exceed the unallocated power available while not providing the power profiles which will exceed the unallocated available power (362).

The controller (110) receives an election of a power profile from the first receptacle (120) (364). The controller (110) provides power to the first receptacle (120) according to the elected power profile (366).

The controller (110) may also perform other activities. For example, the controller may identify a receptacle (120) having a longest session time and/or using a charging power profile and send that receptacle (120) a load shed request in order to free up power to accommodate additional devices. The load shed request may reduce the power profile to the second receptacle to a non-zero power profile. The controller (110) may identify a third receptacle having a second-longest session among the plurality of receptacles (120) and provide a load shed request to the third receptacle (120-3). This process may be repeated as needed. Similarly, the system may rotate power allocations among a number of receptacles to provide some charging to multiple devices rather than allowing a single device on a given port to receive a disproportionate amount of charging.

Figure 4:
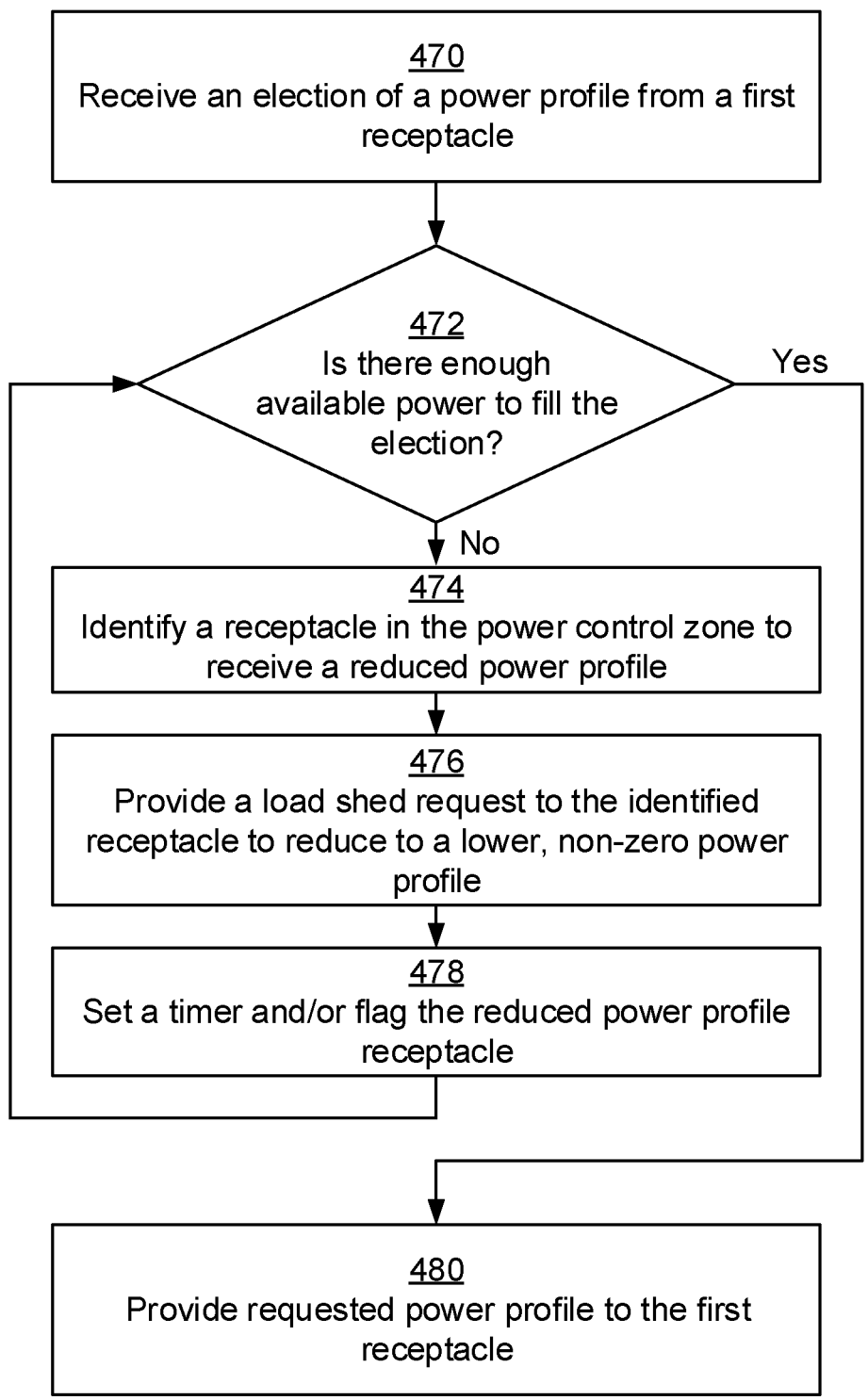
FIG. 4 shows a flowchart for a process consistent with this specification.

FIG. 4 shows a flowchart for a process consistent with this specification. The flowchart includes: receiving an election of a power profile from a first receptacle (FIG. 1, 120-1) (470); determining if there is enough available power to fill the election (472); identifying a receptacle (FIG. 1, 120) in the power control zone to receive a reduced power profile (474); providing a load shed request to the identified receptacle (FIG. 1, 120) to reduce to a lower, non-zero power profile (476); setting a timer and/or flagging the reduced power profile receptacle (FIG. 1, 120) (478); and providing the requested power profile to the first receptacle (FIG. 1, 120-1) (480).

This process outline in FIG. 4 may be performed by a controller (FIG. 1, 110) which controls power allocation in a control zone. The control zone includes a plurality of receptacles (FIG. 1, 120) which connect to a portable electronic device such as a laptop, phone, tablet, camera, etc. The receptacles (120) may include USB receptacles (FIG. 1, 120) which provide predetermined formats and power profiles for a variety of electronic and/or electrical devices.

In this example method, the controller (110) receives an election of a power profile from a first receptacle (FIG. 1, 120-1) (470).

The controller (110) then determines if there is enough available power to fill the election. If there is sufficient unallocated power, the controller (110) does not need to adjust any other power profiles in order to provide the requested power. Accordingly, the controller (110) provides the requested power profile to the first receptacle (FIG. 1, 120-1) (480).

However, if there is not sufficient unallocated power in the control zone then the controller (FIG. 1, 110) modifies the power profile of another receptacle (FIG. 1, 120) to provide the available power for the new election at the first receptacle (FIG. 1, 120-1). In this example, the controller (FIG. 1, 110) identifies a receptacle (FIG. 1, 120) in the power control zone to receive a reduced power profile compared with the existing power profile being provided to that receptacle (FIG. 1, 120) (474). The identified receptacle (FIG. 1, 120) may be the receptacle (FIG. 1, 120) with the longest session length. The identified receptacle (FIG. 1, 120) may be the receptacle (FIG. 1, 120) with the greatest power consumption and/or power profile. The identified receptacle (FIG. 1, 120) may be the receptacle (FIG. 1, 120) with a charging power profile with the longest session length. The identified receptacle (FIG. 1 120) may be the receptacle (FIG. 1, 120) with the longest session length without a flag and/or with a flag. Other combinations of factors may be used to determine the identified receptacles (FIG. 1, 120) consistent with the design goals and requirements for the system (100).

The controller (110) provides a load shed request to the identified receptacle (FIG. 1, 120) to reduce its power profile to a lower, non-zero power profile (476). In an example, the non-zero power profile is a non-charging profile. In an example, the non-zero power profile is a low power device profile.

The controller (110) also sets a timer and/or flags the identified receptacle (FIG. 1, 120) (478). Once the timer is up, the identified receptacle (FIG. 1, 120) is restored to its previous power profile and another receptacle (FIG. 1, 120) is changed to a reduced power profile. The various receptacles (FIG. 1, 120) continue in this manner as successive timers expire, so that no receptacle (FIG. 1, 120) is subject to ongoing low power and no receptacle (FIG. 1, 120) has its preferred high power profile continuously. Instead, the lack of capacity is applied to different receptacles (FIG. 1, 120) in turn, thus distributing its impact. As recharging tends to be the high power consumption power profile with portable electronic devices, the result is that all the devices get charged some rather than some devices getting fully charged and some devices not being charged.

After the identified receptacle (FIG. 1, 120) has been modified, the controller (FIG. 1, 110) checks to see if enough power is available for the requested power profile. If not, the controller (FIG. 1, 110), down regulates the second receptacles (FIG. 1, 120-2) to a lower power profile. This process may continue until enough power is freed up to support the requested power profile at the first receptacle (FIG. 1, 120-1). However, once the timer expires, the controller (FIG. 1, 110) may adjust the power distribution again to provide different devices on other receptacles (FIG. 1, 120) with charging opportunities. In an example, the timer is set for 10 minutes. The timer may be set for 15 minutes, 20 minutes, 30 minutes, and/or some other amount.

In another example, the controller (FIG. 1, 110) excludes all the non-charging receptacles (FIG. 1, 120) and then allocates the power evenly between the charging receptacles (FIG. 1, 120). For example, if a control zone had 100 watts of power and there were 4 devices using USB high power device profiles drawing 2.5 watts and 3 charging devices then first each of the four non-charging devices would be powered at their preferred non-charging power profile. Then the amount of remaining capacity in the power control zone would be divided equally among the three charging devices. So, 100 watts−4*(2.5)=90 watts/3 or 30 watts per charging device. If this 30 watts is greater than the charging capacity of a device then that device would be charged at its maximum power level and any excessed power allocated to the remaining two devices.

It will be appreciated that, within the principles described by this specification, a vast number of variations exist. It should also be appreciated that the examples described are only examples, and are not intended to limit the scope, applicability, or construction of the claims in any way.

What is claimed is:

1. A system for allocating power, the system comprising:
a plurality of receptacles in a power control zone; and
a power delivery controller in communication with each of the plurality of receptacles, wherein the power delivery controller, in response to detecting a connection to a first receptacle in the plurality of receptacles:
determines which power profiles may be provided to the first receptacle provides power profiles to the first receptacle;
receives an election of a power profile from the first receptacle which would exceed an amount of uncommitted available power;
reduces a power profile of a second receptacle of the plurality of receptacles from a charging power profile wherein device charging is provided to a non-charging power profile wherein charging of a device is stopped;
prevent a subset of the plurality of receptacles from receiving a load shed request, wherein the subset of the plurality of receptacles are those receptacles in a non-charging power profile; and
provides power to the first receptacle according to an elected power profile.

2. The system of claim 1, wherein the signaled power profiles are further limited by a type of device connected to the first receptacle and identified by the controller.

3. The system of claim 1, wherein the first receptacle is a Universal Serial Bus-Type C (USB-C) receptacle with only four electrical connections consisting of: power, ground, and two communications lines.

4. The system of claim 1, wherein the power control zone covers receptacles on a row of seats on an airplane.

5. The system of claim 1, wherein the controller identifies a third receptacle having a longest session among the plurality of receptacles and provides the load shed request to the third receptacle.

6. The system of claim 5, wherein the load shed reduces the power profile to the third receptacle to a non-zero power profile.

7. The system of claim 1, wherein the power profiles provided to the first receptacle are determined based on a power control zone of the first receptacle.

8. The system of claim 1, wherein the power delivery controller is further to provide a new set of profiles after a load is removed from the first receptacle.

9. The system of claim 1, wherein providing the power profiles comprises parsing a list of power profiles based on a maximum amount of power provided by each power profile.

10. The system of claim 1, wherein the power delivery controller is further to:
    detect a new connection to the first receptacle of the plurality of receptacles; and
    request a device attached to the second receptacle of the plurality of receptacles reduce an amount of power being received from the second receptacle.

11. The system of claim 10, wherein the plurality of receptacles are connected to a plurality of devices and the power delivery controller is to further negotiate additional power.

12. The system of claim 10, wherein when the power delivery controller receives a request from a third receptacle of the plurality of receptacles which does not exceed the uncommitted available power, the controller provides the requested amount of power to the third receptacle without modifying the power provided to any other receptacle of the plurality of the receptacles.

13. The system of claim 10, wherein a request from the first receptacle comprises configuration data about a device connected to the first receptacle.

14. The system of claim 1 for allocating power in the power control zone on an airplane, wherein the power delivery controller is to:
    receive a signal from the first receptacle indicating a new connection has been made to the first receptacle;
    provide a list of available power profiles to the connection;
    determine an available power to the power control zone, wherein the power control zone comprises the plurality of receptacles including the first receptacle;
    provide a load shed request to a third receptacle of the plurality of receptacles;
    reduce a power profile provided to the third receptacle and commence a timer; and
    upon expiration of the timer, connect the third receptacle at its previous, higher power profile.

15. The system of claim 14, wherein the third receptacle is a receptacle with a greatest load among the plurality of receptacles.

16. The system of claim 14, wherein the power delivery controller rotates which receptacle among the plurality of receptacles is provided with less than an originally requested amount of power at regular intervals.

17. The system of claim 14, wherein the first receptacle accepts a Universal Serial Bus Type-C (USB-C) plug.

18. The system of claim 14, wherein the first receptacle accepts a Universal Serial Bus Type-C (USB-C) plug and has electrical connections consisting of:
    a power supply line;
    a ground line; and
    two communication lines.

* * * * *